US007788705B2

(12) United States Patent
Bruestle et al.

(10) Patent No.: US 7,788,705 B2
(45) Date of Patent: *Aug. 31, 2010

(54) FINE GRAINED ACCESS CONTROL FOR WIRELESS NETWORKS

(75) Inventors: Jeremy J. Bruestle, Seattle, WA (US); Terrance L. Lillie, Redwood City, CA (US)

(73) Assignee: McAfee, Inc., Santa Clara, CA (US)

( * ) Notice: Subject to any disclaimer, the term of this patent is extended or adjusted under 35 U.S.C. 154(b) by 1320 days.

This patent is subject to a terminal disclaimer.

(21) Appl. No.: 10/640,241

(22) Filed: Aug. 12, 2003

(65) Prior Publication Data

US 2004/0093522 A1 May 13, 2004

Related U.S. Application Data

(60) Provisional application No. 60/403,104, filed on Aug. 12, 2002.

(51) Int. Cl.
*H04L 29/06* (2006.01)
*G06F 7/00* (2006.01)
(52) U.S. Cl. ............ 726/4; 726/2; 726/11; 726/21
(58) Field of Classification Search ............ None
See application file for complete search history.

(56) References Cited

U.S. PATENT DOCUMENTS 5,889,958 A * 3/1999 Willens ............ 709/229

| 6,732,270 | B1 * | 5/2004 | Patzer et al. ............ 713/170 |
| 6,760,444 | B1 * | 7/2004 | Leung ............ 380/270 |
| 7,082,535 | B1 * | 7/2006 | Norman et al. ............ 713/163 |
| 7,325,246 | B1 * | 1/2008 | Halasz et al. ............ 726/2 |
| 2003/0084287 | A1 * | 5/2003 | Wang et al. ............ 713/168 |

FOREIGN PATENT DOCUMENTS

WO WO02/09458 1/2002

OTHER PUBLICATIONS

Funk et al., "EAP Tunneled TLS Authentication Protocol (EAP-TTLS)," IETF document "draft-ietf-pppext-eap-ttls-01.txt," Feb. 2002.
Aboba et al., "PPP EAP TLS Authentication Protocol," RFC 2716, Oct. 1999.
Andersson et al., "Protected EAP Protocol (PEAP)," IETF document "draft-josefsson-pppext-eap-tls-eap-05.txt," Sep. 2002.
International Search Report from PCT Application No. PCT/US03/25420 mailed on Jun. 22, 2004.
L. Blunk et al., "PPP Extensible Authentication Protocol (EAP)" Merit Network, Inc. Mar. 1998.
Fisher, "Authentication and Authorization: The Big Picture with IEEE 802.1X" SANS Institute; Dec. 21, 2001.

* cited by examiner

*Primary Examiner*—Jung Kim
(74) *Attorney, Agent, or Firm*—Zilka-Kotab, PC

(57) ABSTRACT

As part of a network node authentication process access control parameters that define the network node's ability to access other resources accessible through a computer network are provided by an authentication server (e.g., a RADIUS server) to an access point through which the network node is seeking to gain access to the computer network.

18 Claims, 3 Drawing Sheets

FINE GRAINED ACCESS CONTROL FOR WIRELESS NETWORKS

RELATED APPLICATIONS

The present application is related to and hereby claims the priority benefit of U.S. Provisional Patent Application No. 60/403,104, entitled "Fine Grained Access Control for Wireless Networks, filed Aug. 12, 2002 by the present inventors, which provisional patent application is assigned to the assignee of the present invention and incorporated herein by reference.

FIELD OF THE INVENTION

The present invention relates to authentication processes for use in wireless computer networks and, in particular, to the exchange of access control parameters between a client and a host within such a network as part of a client authentication process.

BACKGROUND

Wireless computer networks have become popular options for home and small business environments because they offer relatively inexpensive alternatives to traditional, wired computer networks and freedom of mobility for client devices such as notebook computers. However, concerns have been raised over the security, or lack thereof, offered by wireless networks. For example, it has been shown that wireless local area networks (WLANs) based on the IEEE (Institute for Electrical and Electronic Engineers) 802.11a and 802.11b standards are easily compromised by hackers, even if the hackers do not know specific user passwords for the networks beforehand.

The most recent IEEE WLAN specification, 802.1x, provides a roadmap for implementing improved WLAN security. In particular, an authentication server (which may be and external server, e.g., a RADIUS server, or may be combined with the wireless access point) is employed to verify user credentials before access to the network is granted. External authentication servers, such as RADIUS servers, are perhaps preferred in this arrangement because use of an external server avoids the need to store and manage authentication data on every access point of the WLAN, making the solution more scalable. In either case, however, authentication is user-based rather than device-based, so, for example, a stolen notebook computer does not necessarily imply a serious security breach.

Coupled with the use of authentication servers, the 802.1x specification calls for the use of an extensible authentication protocol (EAP) for negotiating a WLAN user's secure connection to the network. Security is handled by vendor-developed EAP authentication types, which may protect user credentials, provide data privacy, or both. For example, EAP-TLS (transport layer security) is used in the 802.1x client in Microsoft's Windows XP operating system to provide for certificate-based, mutual authentication of the client and the network. EAP-TLS also dynamically generates user- and session-based encryption keys that are distributed to the client and the access point to secure the connection.

EAP-TTLS (tunneled transport layer security) is another EAP authentication type co-developed by Funk Software and Certicom Corporation. EAP-TTLS is an extension of EAP-TLS that requires only server-side certificates, eliminating the need to configure certificates for each WLAN client. The protocol securely tunnels client authentication within TLS records, ensuring that the user remains anonymous to eavesdroppers on the wireless link and the entire network to the RADIUS server.

An example of the exchange between a client workstation 10 (e.g., a notebook computer with a WLAN interface card), called a supplicant in the language of the IEEE 802.1x standard, an access point 12 (which is terms an authenticator) a TTLS authentication server 14 and an authentication server 16 is shown in FIG. 1. This figure is adapted from "EAP Tunneled TLS Authentication Protocol", IETF document "draft-ietf-pppext-eap-ttls-01.txt", by Paul Funk and Simon Blake-Wilson, February 2002, (hereinafter "Funk and Blake-Wilson") which is incorporated herein by reference. Note that in some cases, the functions of the TTLS server 14 and the authentication server 16 may be co-located on a single platform, but are shown separately in the diagram for clarity.

A complete discussion of the TTLS protocol is found in Funk and Blake-Wilson and will not be repeated herein. Briefly though, as shown in the diagram, the client 10 and access point 12 initiate an EAP conversation to negotiate the client's access to the network. Typically, the access point 12 begins the conversation by issuing an EAP-Request/Identity packet 101 to the client 10, which responds with an EAP-Response/Identity packet 102. Note that the client 10 does not include the user's actual identity in this EAP-Response/Identity packet 102; rather, the user's identity will not be transmitted until an encrypted channel has been established.

The access point 12 now acts as a passthrough device, allowing the TTLS server 14 to negotiate EAP-TTLS with the client 10 directly. During the first phase of the negotiation, the TLS handshake protocol is used to authenticate the TTLS server 14 to the client 10 and, optionally, to authenticate the client 10 to the TTLS server 14, based on public/private key certificates (see messages 103-113). As a result of the handshake, client 10 and TTLS server 14 now have shared keying material and an agreed upon TLS record layer cipher suite with which to secure subsequent EAP-TTLS communication.

During the second phase of negotiation, client 10 and TTLS server 14 use the secure TLS record layer channel established by the TLS handshake as a tunnel to exchange information encapsulated in attribute-value pairs, to perform additional functions such as client authentication and key distribution for the subsequent data connection (see messages 114-123).

If a tunneled client authentication is performed, the TTLS server 14 de-tunnels and forwards the authentication information to the authentication server 16. If the authentication server 16 performs a challenge, the TTLS server 14 tunnels the challenge information to the client (see messages 115-118). The authentication server 16 only needs to be able to authenticate the client based on commonly used authentication protocols.

Keying material for the subsequent data connection between client and access point may be generated based on secret information developed during the TLS handshake between client and TTLS server. At the conclusion of a successful authentication, the TTLS server 14 may transmit this keying material to the access point 12 (see messages 121 and 122), encrypted based on the existing security associations between those devices (e.g., RADIUS). The client 10 and access point 14 now share keying material, which they can use to encrypt data traffic between them.

SUMMARY OF THE INVENTION

In one embodiment, the present invention and as part of a network node authentication process access control parameters that define the network node's ability to access other resources accessible through a computer network are provided by an authentication server (e.g., a RADIUS server) to an access point through which the network node is seeking to gain access to the computer network. The network node authentication process may make use of an EAP TTLS, EAP TLS, PEAP or other authentication process. The access control parameters may include rules for handling packets, and/or may be associated with routines that allow the access point to monitor any part of a packet header in a packet received from the network node. Alternatively, or in addition, the access control parameters may be associated with state machines at the access point, which itself may include an access privilege table to which the access control parameters refer.

BRIEF DESCRIPTION OF THE DRAWINGS

The present invention is illustrated by way of example, and not limitation, in the figures of the accompanying drawings in which.

DETAILED DESCRIPTION

Described herein are authentication processes for use in wireless computer networks, and in particular those networks that utilize the EAP TTLS, EAP TLS, PEAP (Protected EAP Protocol) or other authentication procedures, to permit the exchange of fine grained access control parameters between a client and a host within such a network. The present invention extends the dialog that occurs between network nodes to allow for the exchange of access privilege parameters that may be used to control a user's access to one or more network features and/or nodes. By allowing for such access parameters to be passed as part of an authentication process, the present invention enhances network security and permits greater control over client access to network resources than is currently provided for in EAP TTLS, EAP TLS or PEAP networks.

To understand the rationale behind the use of access parameters such as those provided for in the present invention, consider a situation in which one or more "guest" computer systems are to join a home or office wireless network. Such an occasion may arise when a worker travels from one office to another in an enterprise or when a salesperson makes a client call on a customer. In the home environment, occasions may arise where friends or relatives visit a home having an existing wireless network and wish to make use of that network and its resources for such tasks as printing documents or digital images or accessing the Internet. In any of these and other situations, the owner/operator of the wireless network may not wish to grant full access to the network and instead provide the guest computer with only some form of limited access. For example, guest computers may be limited to printing only on a designated platform and/or to only having access to the Internet (or even just some Internet addresses).

In many cases, network owners/operators may wish to preclude guest computers from having access to data repositories that contain confidential information.

The need for access control is not limited to situations involving guest computers. For example, certain employees of a network owner/operator may be restricted to only accessing other computers on the network and not general access that would include Internet access. In other cases, Internet access may be filtered (e.g., on a per-user basis) so that restricted Web sites are not visited. In order to support these and other forms of access controls within wireless networks, the present invention provides a straightforward mechanism by which access control parameters may be passed to an access point. In some cases, these access control parameters may be cached locally at one or more access points and only updated on an as-needed basis.

Figure 1:
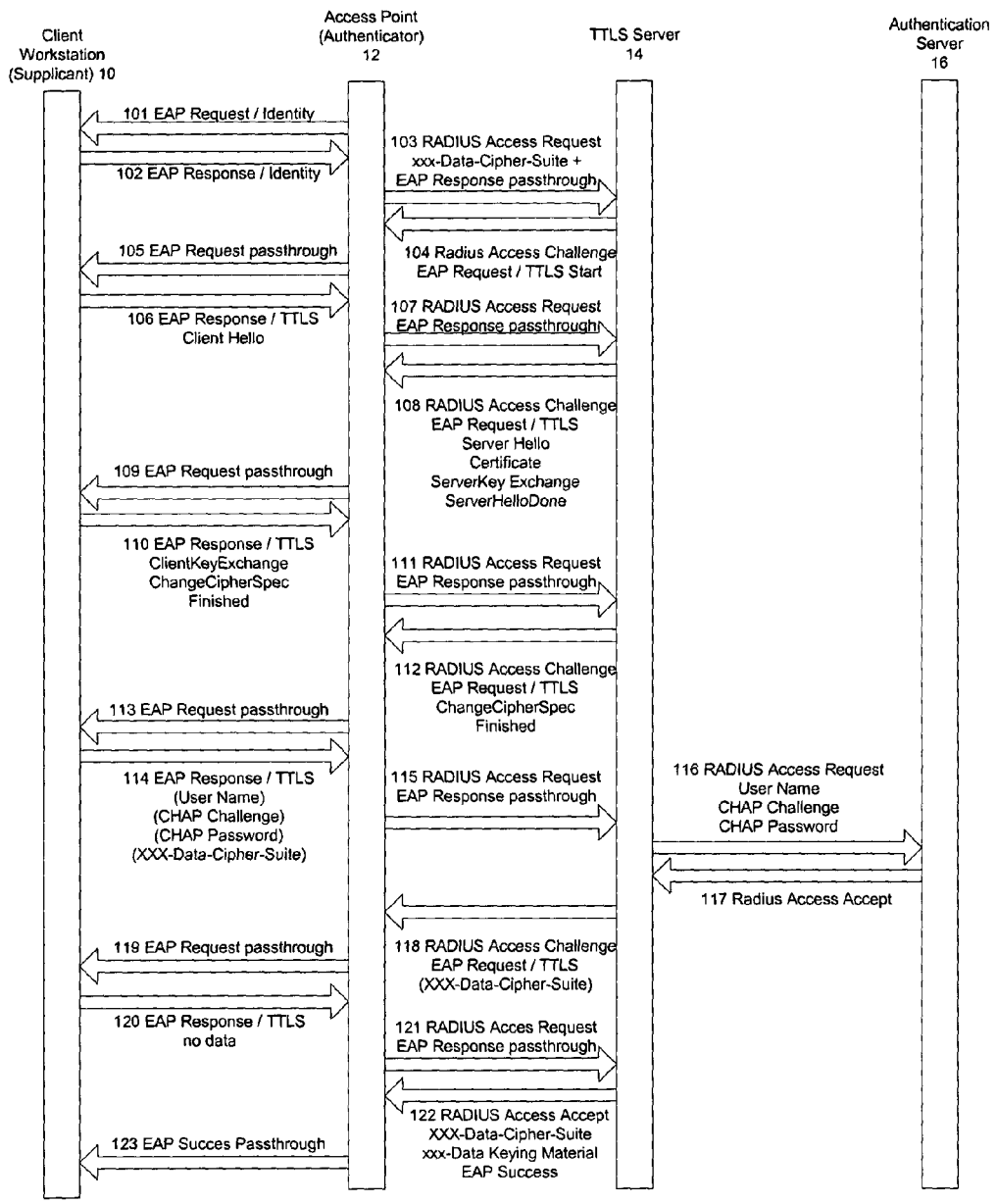
FIG. 1 illustrates a conventional EAP TTLS authentication exchange between a client, an access point, a TTLS server and an authentication server.
Figure 2:
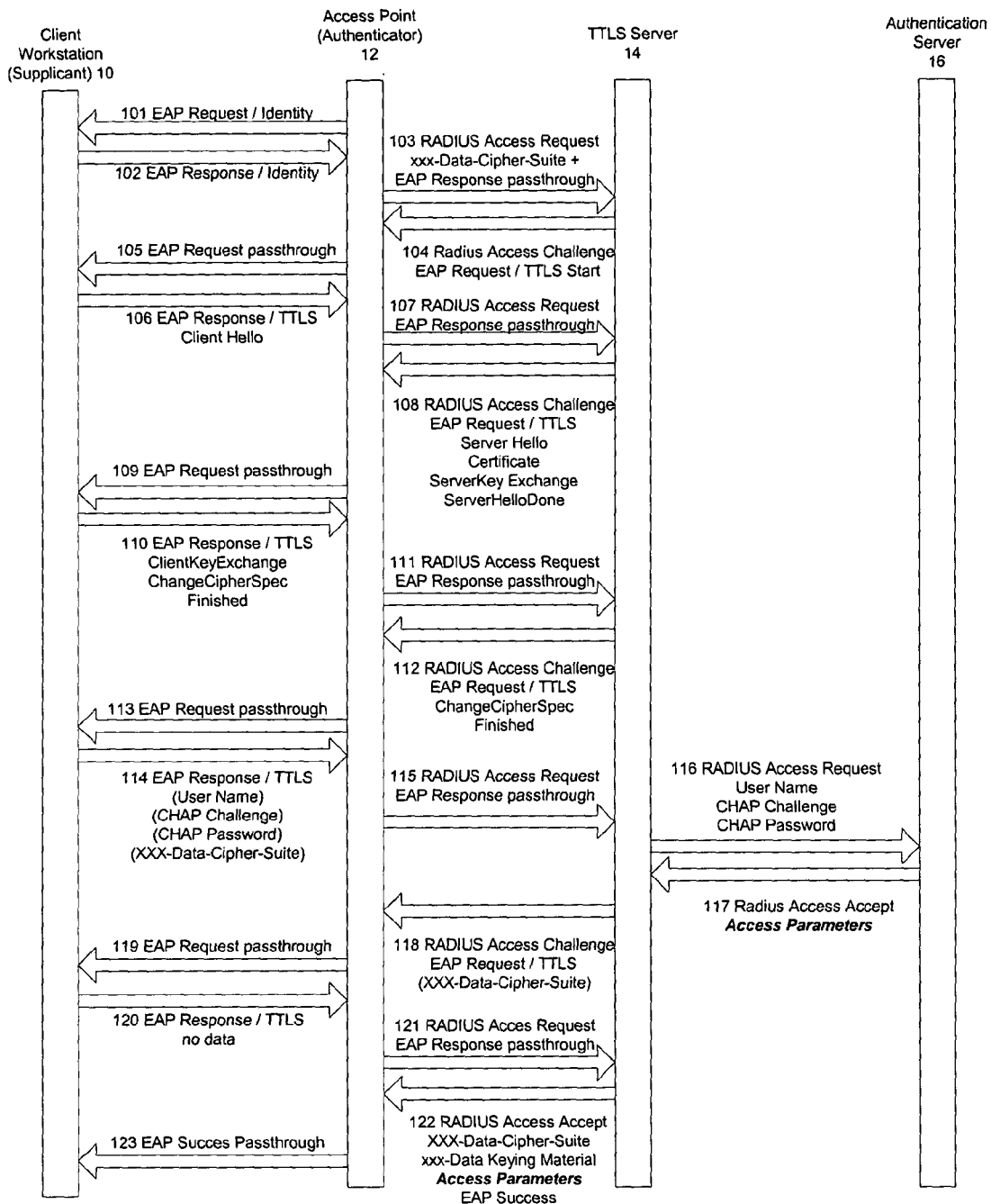
FIG. 2 illustrates an EAP TTLS authentication exchange between a client, an access point, a TTLS server and an authentication server according to an embodiment of the present invention.

FIG. 2 illustrates the procedures involved in the exchange of the access control parameters. As illustrated for an EAP TTLS handshake exchange, the conventional protocol is modified by the addition, in messages 117 and 122, of the access parameters. In message 117, the access parameters are passed from the authentication server 16 to the TTLS server 14. Then, as part of message 122, the TTLS server 14 passes the access parameters to access point 12. Thus, once a user has successfully passed in credentials that have been validated by the authentication server 16, access privilege parameters are passed back to the access point 12 and these access privileges will govern the user's usage of network resources. Note that in some cases the access point 12 may be a wireless router having a firewall capability, in which case the access parameters may include local firewalling/filtering capabilities.

Examples of the types of access privileges that may be exchanged in this fashion are described below in Table 1. The access privileges are assigned on a per-user basis. Thus, prior to the user joining the network, the network owner/operator will need to associate the user with a set of access parameters. Then, at the time the user joins the network, the corresponding set of access privileges may be passed from the authentication ser 16 to the access point 12.

TABLE 1

Examples of Access Privileges

| Access Privilege | Description |
| --- | --- |
| Full Access | User has complete access to the local network and to the Internet |
| Internet Only | User has access to the Internet but not the local network |
| Local Access Only | User has access to the local network but not the Internet |
| Full Local Access, Limited Internet Access | User has complete access to the local network but is blocked from accessing specific Internet sites |
| Full Internet Access, Limited Local Access | User has full access to the Internet but may only access specific nodes of the local network (e.g., a networked printer) |
| Limited Internet Access, Limited Local Access | User is blocked from accessing specific Internet sites and may only access specific nodes on the local network |

In some cases, the access parameters may be selected from a list of possible rule sets during the authentication negotiation. Otherwise, the access parameters are simply passed to the access point on the basis of the client authentication. In either case, the access parameters are potentially unique to each user or to various user groups. The access parameters may be implemented as rules for packet forwarding/routing/ filtering/dropping, similar to those used in firewall applications. Because some access points are in fact wireless routers, such rule sets may already exist at the access point and need only be called in connection with a client's set of access privileges.

For example, the access parameters may be associated with routines that allow the access point to monitor any part of a packet header in a packet received from a client. This includes the 802.11b or other link level headers, the IP headers, or higher-level headers such as TCP headers. The access privileges may also be associated with state machines at the access point, that is, the access point may, in accordance with the access privileges granted a client, keep some state information which can be changed by the reception of packets and which influences the routing of future packets. For example, the state machine may prohibit Internet traffic from entering the network unless it is in response to a specific client request. The access privileges may also call for the modification of some packet data. All of these features allow for the potential of very detailed (or fine grained) control over a user's actual use of a wireless network.

The present invention differs from other approaches to access control that make use of so-called VLANs (virtual local area networks). In the VLAN approach, different networks are configured in advance and at client authentication time a user is directed to one of those networks according to the user's access privileges. Thus, separate VLANs may need to be established for users that are entitled to access the Internet, users that can have full local network access and so on. This is a complex task and generally requires that an experienced network engineer oversee the process. Furthermore, the VLAN approach provides only a coarse degree of control over the access privileges granted to a user inasmuch as each user must be shunted to a predefined one of the available networks, or precluded from access altogether.

In contrast, the present invention provides a flexible scheme in which access privileges can be tailored at the user level, rather than the network level. Conceivably, each user could have unique access privileges established that are associated with the user each time he or she connects to the network, regardless of the platform that the user uses for that connection. No complex network partitioning is required. Instead, to add a new user or modify an existing user's access privileges, one need only update the access privilege table at the authentication server to have the new privileges take effect the next time the user seeks admission to the network.

It is possible for the access privilege tables to be distributed among the various access points of a network, but this would increase the burden on a network administrator when it came time to add new users or modify another user's privileges. Thus, for networks having any significant number of access points, the preferred approach is to keep the access privilege table resident at the authentication server (which may be combined with the TTLS server in some implementations).

In addition to EAP TTLS implementations, the present invention may be utilized with various authentication procedures including EAP-TLS (transport level security), in which both the client and the authentication server identify themselves to one another using digital certificates; EAP-SRP (secure remote password), in which both devices are authenticated using a password; EAP-MD5, in which only the client is authenticated by the server on the basis of a password; and protected EAP (PEAP), which uses a secure channel. In the EAP-TLS, EAP-TTLS and EAP-SRP processes, encryption keys for use between the AP and the client are generated as part of the exchange. In PEAP, a secure channel that is both encrypted and integrity-protected with TLS is created and then a new EAP negotiation with another EAP type occurs, authenticating the network access attempt of the client. Because the TLS channel protects EAP negotiation and authentication for the network access attempt, password-based authentication protocols that are normally susceptible to an offline dictionary attack can be used for authentication.

Figure 3:
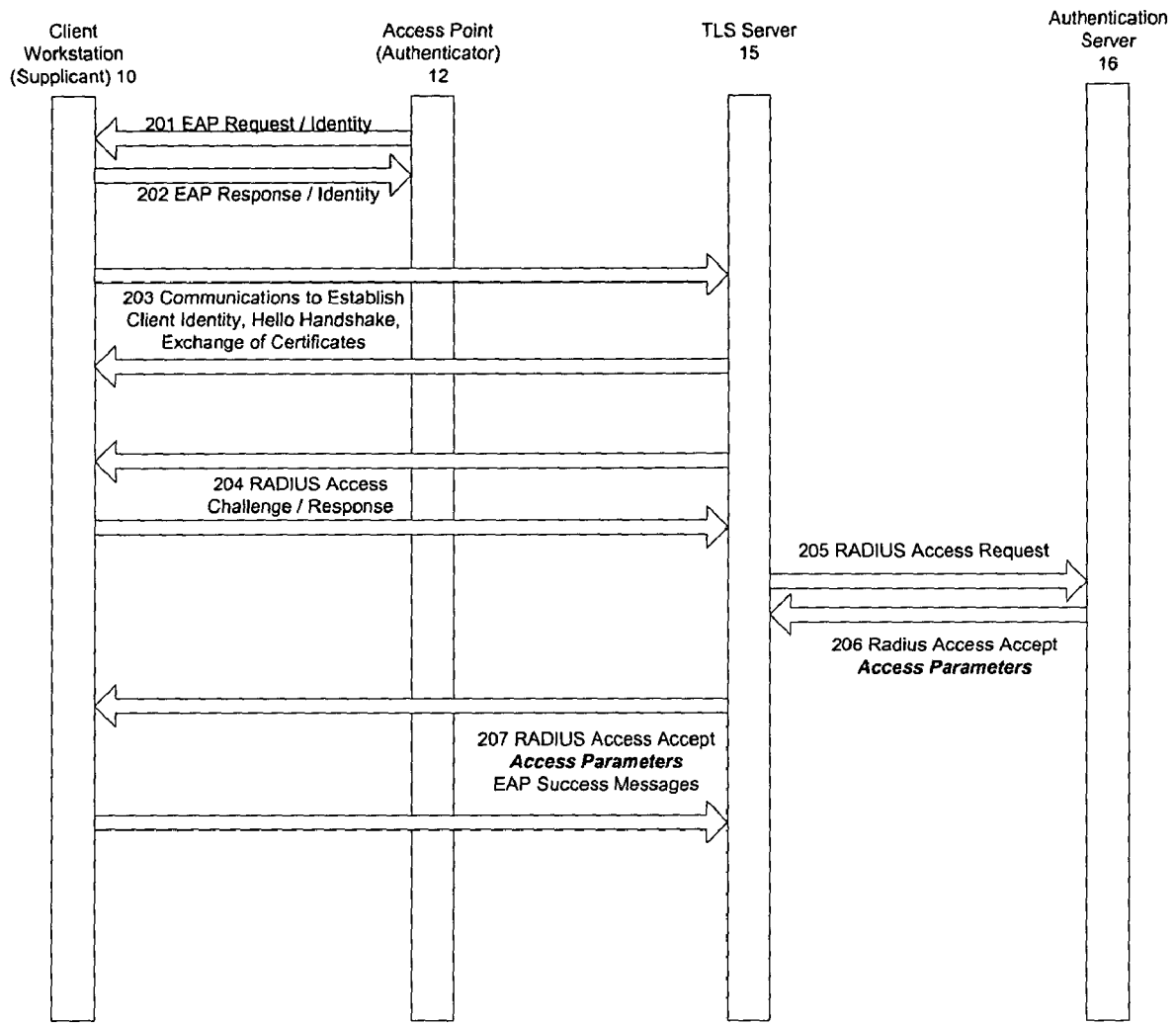
FIG. 3 illustrates an EAP TLS authentication exchange between a client, an access point, a TTLS server and an authentication server according to an embodiment of the present invention.

An example of the exchange between a client 10, an access point 12, a TLS authentication server 15 and an authentication server 16 is shown in FIG. 3. Note that in some cases, the functions of the TLS server 15 and the authentication server 16 maybe co-located on a single platform, but are shown separately in the diagram for clarity.

A complete discussion of the EAP TLS protocol is found in B. Aboba and D. Simon, "PPP EAP TLS Authentication Protocol," RFC 2716 (October 1999), incorporated herein by reference, and will not be repeated herein. Briefly though, as shown in the diagram, the client 10 and access point 12 initiate an EAP conversation to negotiate the client's access to the network. Typically, the access point 12 begins the conversation by issuing an EAP-Request/Identity packet 201 to the client 10, which responds with an EAP-Response/Identity packet 202.

The access point 12 now acts as a passthrough device, allowing the TLS server 15 to negotiate EAP-TLS with the client 10 directly. This communication 203 includes a TLS handshake and exchange of certificates. Thereafter, RADIUS authentication communications 204 and message 205 are exchanged. As illustrated, the conventional protocol is modified by the addition, in message 206 and communications 207, of the fine grained access parameters. In message 206, the access parameters are passed from the authentication server 16 to the TLS server 15. Then, as part of communications 207, the TLS server 15 passes the access parameters to access point 12. Thus, once a user has successfully passed in credentials that have been validated by the authentication server 16, access privilege parameters are passed back to the access point 12 and these access privileges will govern the user's usage of network resources.

A similar exchange can be used in cases where PEAP is used. PEAP is described in detail in H. Andersson et al., "Protected EAP Protocol (PEAP)," draft-josefsson-pppext-eap-tls-eap-05 (September 2002), incorporated herein by reference. In brief, PEAP provides support for identity protection by initially negotiating a TLS channel before exchanging the EAP Identity Request/Response messages. As with TLS and TTLS, the conventional PEAP message exchange is modified, in accordance with the present invention, by the addition of fine grained access control parameters being passed from the RADIUS server to the authenticator upon successful validation of the client credentials. Similar modifications to pass fine grained access parameters may be made to other existing and future protocols to implement the methods of the present invention.

Thus, an authentication processes for use in wireless computer networks that involves the exchange of access control parameters between a client and a host within such a network has been described. Note that the authentication server described herein may be a local network resource or an external resource accessible over the Internet. In the latter case, it may be beneficial to cache the access privilege table at one or more access points to accommodate situations where the access point does not have Internet access (e.g., due to service provider failures and the like). When users attempt to gain access to network facilities that are not authorized by the user's corresponding access privileges, the access point may simply drop the packets or, in some cases, return a form of error message indicating that the attempted access is not authorized.

What is claimed is:

1. A method, comprising exchanging, as part of a network node authentication process, access control parameters that define the network node's ability to access other resources accessible through a computer network, the access control parameters being provided by an authentication server to an access point through which the network node is seeking to gain access to the computer network;
   - wherein the access control parameters are selected from a list of possible rule sets during the authentication process;
   - wherein the access control parameters are assigned on a per-user basis;
   - wherein the access point includes an access privilege table to which the access control parameters refer;
   - wherein the access control parameters are associated with routines that allow the access point to monitor any part of a packet header in a packet received from the network node.

2. The method of claim 1, wherein the network node authentication process makes use of an EAP TTLS authentication process.

3. The method of claim 1 wherein the network node authentication process makes use of an EAP TLS authentication process.

4. The method of claim 1 wherein the network node authentication process makes use of a PEAP authentication process.

5. The method of claim 1 wherein the network node authentication process requires the network node and the authentication server identify themselves to one another using digital certificates.

6. The method of claim 1 wherein the network node authentication process requires the network node and the authentication server to be authenticated using a password.

7. The method of claim 1 wherein the network node authentication process provides for only the network node to be authenticated on the basis of a password.

8. The method of claim 1 wherein the network node authentication process uses a secure channel.

9. The method of claim 8 wherein the secure channel is both encrypted and integrity-protected.

10. The method of claim 1 wherein the network node authentication process includes an exchange of encryption keys for use between the access point and the network node.

11. The method of claim 1 wherein the authentication server comprises a RADIUS server.

12. The method of claim 1 wherein the access control parameters comprise rules for handling packets.

13. The method of claim 1 wherein the access control parameters are associated with state machines at the access point.

14. The method of claim 1 wherein the resources include Internet access.

15. The method of claim 1 wherein the access control parameters are provided to the access point only upon successful verification of the network node's credentials by the authentication server.

16. The method of claim 1 wherein the access point comprises a wireless network access point and the network node communicates with the access point using a wireless network communication protocol.

17. The method of claim 1 wherein the access control parameters are cached locally at the access point and are updated by the authentication server on an as-needed basis.

18. A method, comprising exchanging, as part of a network node authentication process, access control parameters that define the network node's ability to access other resources accessible through a computer network, the access control parameters being provided by an authentication server to an access point through which the network node is seeking to gain access to the computer network;
   - wherein the access control parameters are selected from a list of possible rule sets during the authentication process;
   - wherein the access control parameters are assigned on a per-user basis;
   - wherein the access point includes an access privilege table to which the access control parameters refer;
   - wherein the access control parameters are assigned on the per-user basis by associating a user of the network node with the access control parameters prior to the network node joining the computer network, such that the access control parameters are passed from the authentication server to the access point at a time the network node joins the network.

* * * * *